(12) United States Patent  
Sugiarto et al.

(10) Patent No.: US 11,353,700 B2  
(45) Date of Patent: Jun. 7, 2022

(54) ORIENTATION PREDICTING METHOD, VIRTUAL REALITY HEADSET AND NON-TRANSITORY COMPUTER-READABLE MEDIUM

(71) Applicant: INDUSTRIAL TECHNOLOGY RESEARCH INSTITUTE, Hsinchu (TW)

(72) Inventors: Tommy Sugiarto, Taipei (TW); Chi-Tien Sun, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/065,443

(22) Filed: Oct. 7, 2020

(65) Prior Publication Data  
US 2022/0107496 A1    Apr. 7, 2022

(51) Int. Cl.  
*G02B 27/00* (2006.01)  
*G06N 3/08* (2006.01)  
*G02B 27/01* (2006.01)

(52) U.S. Cl.  
CPC ....... *G02B 27/0093* (2013.01); *G02B 27/017* (2013.01); *G06N 3/08* (2013.01)

(58) Field of Classification Search  
CPC .... G02B 27/0093; G02B 27/017; G06N 3/08; G06N 20/00; G06F 3/011; G06F 3/0346;  
(Continued)

(56) References Cited

U.S. PATENT DOCUMENTS

| | | | |
|---|---|---|---|
| 9,495,801 | B2 | 11/2016 | Ebstyne |
| 9,788,714 | B2 | 10/2017 | Krueger |
| 9,898,866 | B2 | 2/2018 | Fuchs et al. |
| 2019/0235620 | A1 | 8/2019 | Lavalle |
| 2019/0236836 | A1 | 8/2019 | Mallinson |

(Continued)

FOREIGN PATENT DOCUMENTS

| | | |
|---|---|---|
| CN | 110120229 A | 8/2019 |
| JP | 2019532392 A | 11/2019 |

(Continued)

OTHER PUBLICATIONS

Taiwan Office Action issued in corresponding application No. 109136365, dated Mar. 25, 2021.

(Continued)

*Primary Examiner* — Xilin Guo  
(74) *Attorney, Agent, or Firm* — Maschoff Brennan

(57) ABSTRACT

An orientation predicting method, adapted to a virtual reality headset, comprises obtaining an orientation training data and an adjusted orientation data, wherein the adjusted orientation data is obtained by cutting a data segment off from the orientation training data, wherein the data segment corresponds to a time interval determined by an application latency; training an initial neural network model based on the orientation training data and the adjusted orientation data corresponding to the time interval; retrieving a real-time orientation data by an orientation sensor of the virtual reality headset; and inputting the real-time orientation data to the trained neural network model to output a predicted orientation data. The present disclosure further discloses a virtual reality headset and a non-transitory computer-readable medium.

6 Claims, 7 Drawing Sheets

(58) Field of Classification Search
CPC ............... G06F 3/017; G06F 3/012; G06T 2207/20084; G06T 7/70; G06T 2207/20081; G06T 7/74; G06T 7/80; G06T 7/97; G06T 19/006; G06T 7/73; G06T 9/002; G06V 10/82; G06V 40/23

See application file for complete search history.

(56) References Cited

U.S. PATENT DOCUMENTS

| | | | |
|---|---|---|---|
| 2019/0340435 A1 | 11/2019 | Rabinovich | |
| 2020/0132996 A1 | 4/2020 | Yokota | |
| 2020/0202628 A1 | 6/2020 | Jones et al. | |
| 2020/0410740 A1* | 12/2020 | Croxford | G06T 15/005 |
| 2021/0055545 A1* | 2/2021 | Rodgers | G06F 3/011 |

FOREIGN PATENT DOCUMENTS

| | | |
|---|---|---|
| TW | 200532524 A | 10/2005 |
| TW | 202004421 A | 1/2020 |
| TW | 202009786 | 3/2020 |

OTHER PUBLICATIONS

Rhijn et al., "An analysis of orientation predicition and filtering methods for VR/AR" 2005.

Garcia-Agundez et al., "An Evaluation of Extrapolation and Filtering Techniques in Head Tracking for Virtual Environments to Reduce Cybersickness" 2017.

Himberg et al., "Head Orientation Prediction: Delta Quaternions Veruss Quaternions" Dec. 2009.

Choi et al., "Prediction-based latency compensation technique for head mounted display" 2016.

Kiruluta et al., "Predictive head movement tracking using a Kalman filter" Apr. 1997.

T. Aykut, "Realtime 3D 360-Degree Telepresence With Deep-Learning-Based Head-Motion Prediction" Mar. 1, 2019.

Lavalle et al., "Head Tracking for the Oculus Rift" May 2014.

* cited by examiner

ORIENTATION PREDICTING METHOD, VIRTUAL REALITY HEADSET AND NON-TRANSITORY COMPUTER-READABLE MEDIUM

BACKGROUND

1. Technical Field

This disclosure relates to an orientation predicting method, a virtual reality headset and a non-transitory computer-readable medium, in particular, relates to an orientation predicting method, a virtual reality headset and a non-transitory computer-readable medium for predicting a head motion of a user using a virtual reality headset.

2. Related Art

The technology of virtual reality (VR) with a head mounted display (HMD) has evolved rapidly. The VR technology has already been applied in various fields, from entertainments such as video games, navigation, virtual traveling, education, even to medical field where surgeons practicing or performing surgery with HMD devices.

VR technology uses artificial sensory simulation to induce the user performing a targeted behavior with the user having minimum awareness about the interference. However, the artificial sensory simulation may fail to accurately create a perceptual illusion for the user due to motion-to-photon (MTP) latency. That is, a latency may occur between the displayed image and the user's motion due to the fact that there exists a time interval between the user's motion and the resulting update of a new frame on the HMD device. And motion-to-photon latency may cause the user to have motion sickness.

In order to solve the above-mentioned problem, head movement prediction is the main solution to compensate the latency. That is, the conventional method for predicting head movement uses extrapolation and filter-based prediction method based on two or more sets of previous data to reduce noise and predict the user's head movement, so as to reduce or compensate for the latency.

SUMMARY

Accordingly, this disclosure provides an orientation predicting method, a virtual reality headset and a non-transitory computer-readable medium to solve the above-mentioned problems and to provide a better user experience when using the virtual reality headset.

According to one or more embodiment of this disclosure, an orientation predicting method, adapted to a virtual reality headset, comprising: obtaining an orientation training data and an adjusted orientation data, wherein the adjusted orientation data is obtained by cutting a data segment off from the orientation training data, wherein the data segment corresponds to a time interval determined by an application latency; training an initial neural network model based on the orientation training data and the adjusted orientation data for obtaining a trained neural network model corresponding to the time interval; retrieving a real-time orientation data by an orientation sensor of the virtual reality headset; and inputting the real-time orientation data to the trained neural network model to output a predicted orientation data.

According to one or more embodiment of this disclosure, a virtual reality headset, comprising: an orientation sensor, retrieving the real-time orientation data of the virtual reality headset; a processor, inputting the real-time orientation data to a trained neural network model of the processor for obtaining a predicted orientation data, wherein the trained neural network model is obtained by training an initial neural network model based on an orientation training data and an adjusted orientation data, wherein the adjusted orientation data is obtained by cutting a data segment off from the orientation training data, wherein the data segment corresponds to a time interval determined by an application latency; and a screen, displaying a predicted image according to the predicted orientation data.

According to one or more embodiment of this disclosure, a non-transitory computer-readable medium, storing an executable instruction which, when executed, causes a virtual reality headset to perform a method comprising: retrieving a real-time orientation data by an orientation sensor and inputting the real-time orientation data to a trained neural network model to output a predicted orientation data, wherein the trained neural network model is obtained by training an initial neural network model based on an orientation training data and an adjusted orientation data, wherein the adjusted orientation data is obtained by cutting a data segment off from the orientation training data, wherein the data segment corresponds to a time interval determined by an application latency.

In view of the above description, according to one or more embodiments of the orientation predicting method, a virtual reality headset and a non-transitory computer-readable medium of the present disclosure, the MTP latency can be effectively reduced and an accurate head movement of the user can be made, therefore, the user can have a better experience when using the virtual reality headset without having motion sickness.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
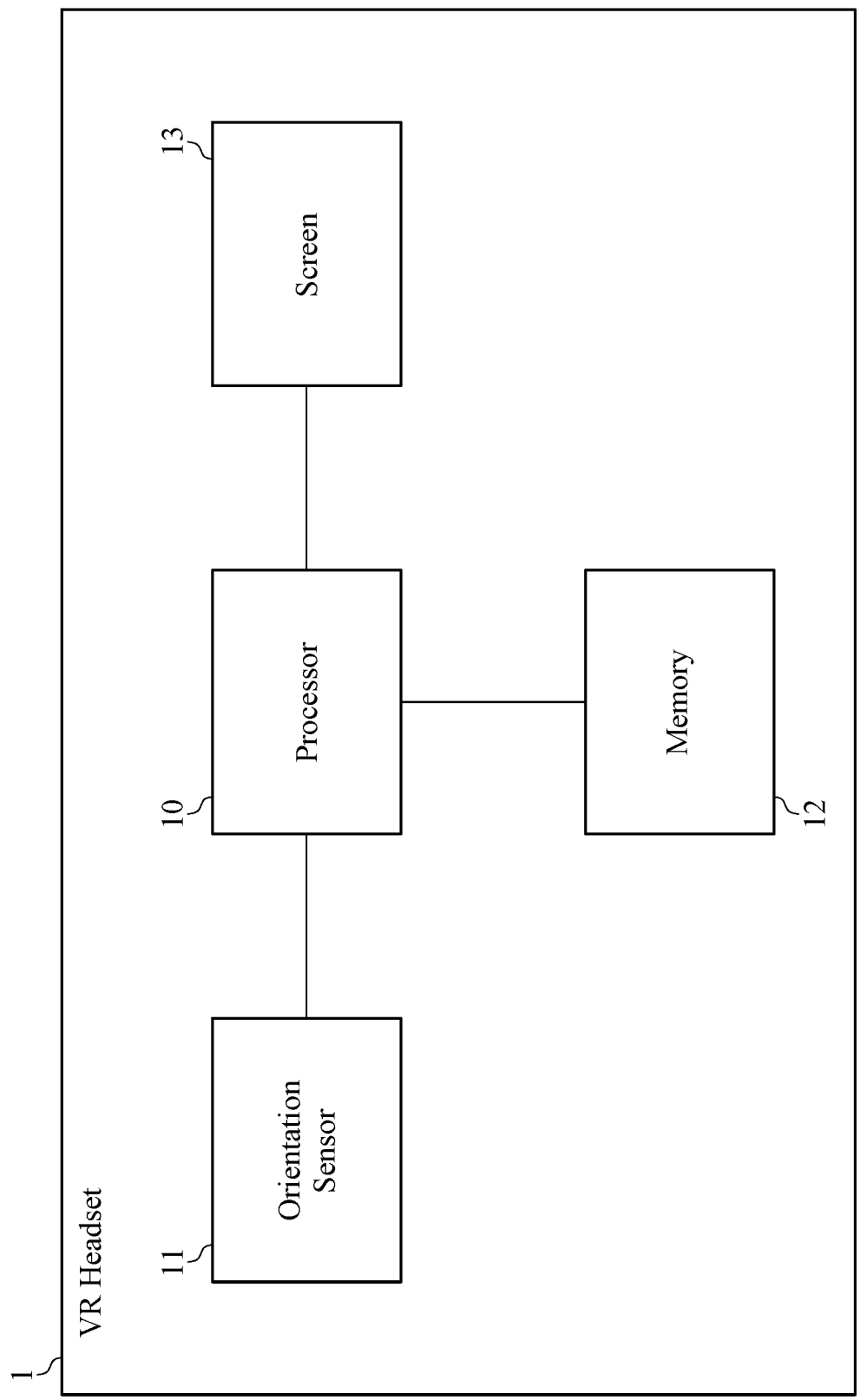
FIG. 1 is a block diagram illustrating a virtual reality headset according to an embodiment of the present disclosure.
Figure 2:
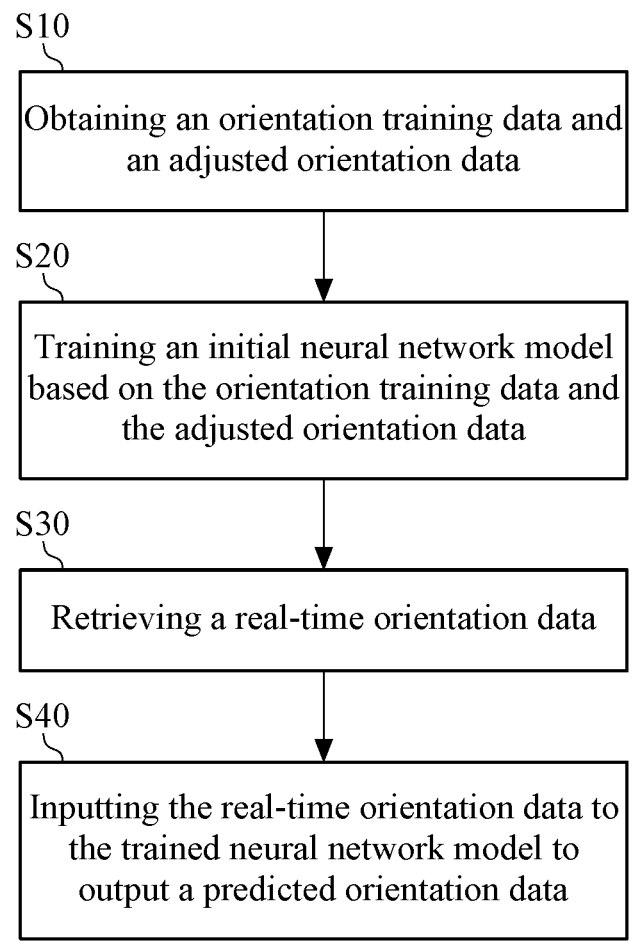
FIG. 2 is a flowchart illustrating an orientation predicting method according to an embodiment of the present disclosure.

Please refer to both FIGS. 1 and 2, wherein FIG. 1 is a block diagram illustrating a virtual reality headset according to an embodiment of the present disclosure; and FIG. 2 is a flowchart illustrating an orientation predicting method according to an embodiment of the present disclosure.

The virtual reality headset 1 of the present disclosure comprises a processor 10, an orientation sensor 11, a memory 12 and a screen 13, wherein the virtual reality headset 1 may be a head mounted display (HMD) device. Specifically, with the data retrieved by the orientation sensor 11 and a neural network model stored in the memory 12, the processor 10 can activate the screen 13 to display images, and the virtual reality headset 1 can perform the orientation predicting method. That is, when an executable instruction stored in a non-transitory computer-readable medium is executed by the processor 10, the virtual reality headset 1 can be instructed to perform the orientation predicting method.

Further, the orientation sensor 11 is configured to retrieve the real-time orientation data of the virtual reality headset 1. The orientation sensor 11 is preferably an inertial measurement unit (IMU) sensor comprising a triaxial accelerometer, a gyroscope and a magnetometer, however, the present disclosure is not limited thereto. The orientation sensor 11 can also be any other type of orientation sensor that can detect pitch, roll, and yaw movements of the user (virtual reality headset 1).

The memory 12 of the virtual reality headset 1 can store the data retrieved by the orientation sensor 11 as well as one or more neural network models that are used for predicting a user's head movement. The screen 13 of the virtual reality headset 1 can display images corresponding to the predicted head movement of the users.

It should first be noted that, steps S10 and S20 are preferably performed by a computer or any other computing device before step S30. In other words, steps S10-20 are steps for establishing a trained neural network model which is preferably established before receiving the real-time orientation data from the orientation sensor 11. The steps of establishing the trained neural network model are preferably performed by a computing device of the manufacturer, or by first accumulating a plurality of orientation training data and then establishing the trained neural network model by a computing device of the end user. The steps of establishing the trained neural network model can also be performed by the processor 10 of the virtual reality headset 1, the present disclosure is not limited thereto. The following steps of establishing the trained neural network model will be illustrated being performed by the processor 10.

Please refer to FIG. 2 again, step 10: Obtaining an orientation training data and an adjusted orientation data.

The processor 10 obtains an orientation training data and an adjusted orientation data for the training of an artificial intelligence (AI) model, which is preferably a neural network model, wherein the adjusted orientation data is obtained by cutting a data segment off from the orientation training data, and the data segment corresponds to a time interval determined by an application latency. The application latency is, for example, a motion-to-photon (MTP) latency.

Specifically, both the orientation training data and the adjusted orientation data are previously obtained data and preferably comprise pitch, roll, and yaw data. The difference between the orientation training data and the adjusted orientation data lies in that, the adjusted orientation data is obtained by cutting the data segment off from the orientation training data, wherein the data segment relates to the time interval (application latency) which is determined according to the application run by the virtual reality headset 1 when the orientation sensor 11 is obtaining the orientation training data.

For example, there may be a 50 ms application latency between the orientation training data and the adjusted orientation data, and the 50 ms application latency can be used as the time interval. The latency may be caused by tracking delay, networking delay, application delay, rendering delay and/or display delay of the virtual reality headset 1. Therefore, the adjusted orientation data can be obtained by cutting the data segment corresponding to the 50 ms application latency from the orientation training data. In other words, the adjusted orientation data is the orientation training data that is 50 ms later.

Step 20: training an initial neural network model based on the orientation training data and the adjusted orientation data.

The processor 10 can train the initial neural network model based on the orientation training data and the adjusted orientation data for obtaining a trained neural network model corresponding to the time interval, wherein the initial neural network model preferably comprises a one-dimensional convolutional neural network (1D-CNN). Specifically, since each of the orientation training data and the adjusted orientation data includes data in yaw, pitch and roll dimensions independent of each other, and the data representing any one of the three dimensions is preferably the angles of yaw/pitch/roll at time points, the 1D-CNN is extremely suitable to serve as the initial neural network model. However, the neural network model may also comprise a fully connected network (FCN), a long-short term memory (LSTM) and a convolutional neural network (CNN). The orientation training data and the adjusted orientation data are inputted to the initial neural network model to train the model to determine a predicted orientation data when receiving a real-time orientation data.

It should be noted that, the neural network model can also be a hybrid of the ID-CNN and the FCN or the CNN, wherein the models mentioned herein are examples and not to limit the present disclosure while the neural network model can be chosen based on the input and output data type.

In practice, before start using the virtual reality headset 1, the user can be asked to perform some head movements to collect the orientation training data and the adjusted orientation data for training the initial neural network model. With this approach, the trained neural network model can predict a head movement that fits more to the user's moving habits (such as speed or angle) and the corresponding application run by the virtual reality headset 1.

Step 30: retrieving a real-time orientation data.

That is, after the initial neural network model is trained and the trained neural network model is obtained, the orientation sensor 11 can retrieve the real-time orientation of the virtual reality headset 1. The real-time orientation is preferably the same data type of the orientation training data and the adjusted orientation data. Therefore, in the present embodiment, the real-time orientation preferably comprises pitch, roll, and yaw data.

Step S40: inputting the real-time orientation data to the trained neural network model to output a predicted orientation data.

That is, after obtaining the trained neural network model, the processor 10 can receive the real-time orientation data from the orientation sensor 11 and input the real-time orientation data to the trained neural network model. Therefore, the processor 10 can output the predicted orientation data, wherein the predicted orientation data represents the future head movement of the user (virtual reality headset 1).

In other words, take the above-mentioned 50 ms application latency as an example, since the virtual reality headset 1 has the 50 ms application latency between the user's real-time head movement and the image displayed by the screen 13 of the virtual reality headset, the processor 10 can input the real-time orientation data into the trained neural network model that is trained with the 50 ms application latency data (the orientation training data and the adjusted orientation data). The processor 10 then can obtain the predicted orientation data output from the trained neural network model. Accordingly, the application latency can be reduced and the screen 13 can display a predicted image that corresponds to the predicted orientation data.

Figure 3:
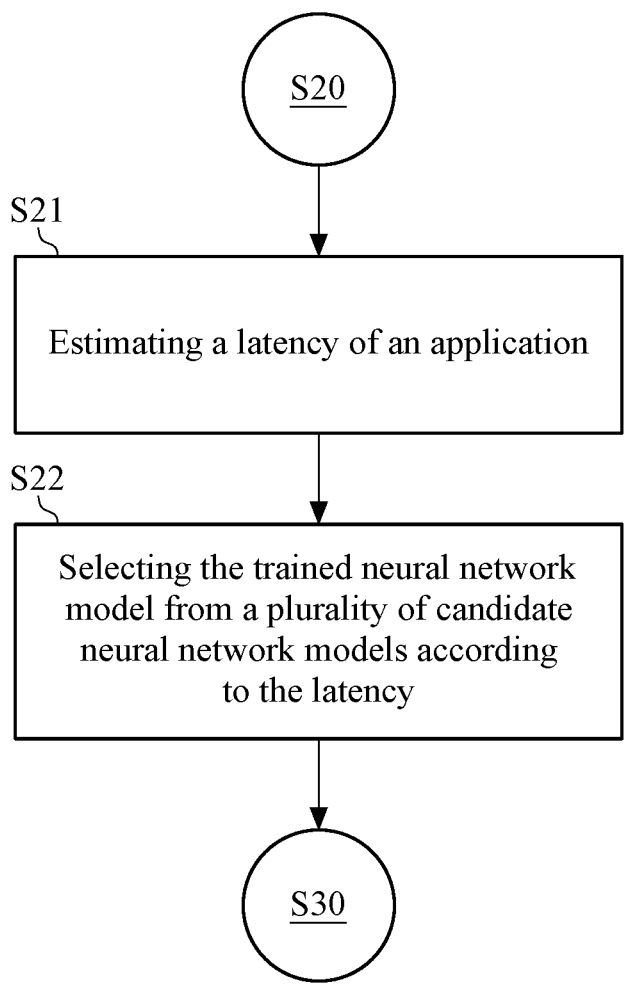
FIG. 3 is a flowchart illustrating an orientation predicting method according to another embodiment of the present disclosure.

Please refer to FIGS. 1 and 3, wherein FIG. 3 is a flowchart illustrating an orientation predicting method according to another embodiment of the present disclosure. That is, the orientation predicting method illustrated in FIG. 3 is similar to that of FIG. 2, the difference between FIGS. 2 and 3 is that, after obtaining the trained neural network model (step S20), and before retrieving the real-time orientation data (step S30), the orientation predicting method illustrated in FIG. 3 further comprises steps S21 and S22. Specifically, steps S10 and S20 can be performed multiple times for different time intervals, so as to obtain a plurality of candidate neural network models. And the obtained candidate neural network models can be stored in the memory 12.

In other words, after obtaining the trained neural network model in step S20, the processor 10 can perform step S21: estimating a latency of an application.

That is, the virtual reality headset 1 runs an application when in operation, wherein the application may be a video game or other types of virtual reality applications. The processor 10 of the virtual reality headset 1 can estimate the latency of the application for determining which trained neural network model to use for predicting the predicted orientation data.

Step S22: selecting the trained neural network model from a plurality of candidate neural network models according to the time delay.

As mentioned above, the memory 12 may store a plurality of candidate neural network models, wherein the candidate neural network models correspond to different time intervals respectively.

Therefore, the processor 10 estimates the latency of the application to determine which candidate neural network model to use to obtain the predicted orientation data. To be more specific, the processor 10 can train a plurality of initial neural network models in advance with different time intervals to obtain the plurality of candidate neural network models. For example, the plurality of candidate neural network models may be obtained from training a plurality of initial neural network models with a 15 ms, a 30 ms, a 50 ms, and a 100 ms time interval respectively. The mentioned time intervals are merely examples, the present disclosure is not limited thereto.

Therefore, after estimating the latency of the application that is run by the virtual reality headset 1, the processor 10 can select the corresponding candidate neural network model, with the latency closer to the time interval corresponding to the trained neural network model than to the time intervals corresponding to the others of the candidate neural network models. For example, when the latency is 100 ms, the processor 10 can select the corresponding candidate neural network model that was trained with the 100 ms time interval. Therefore, the processor 10 can use the selected candidate neural network model as the trained neural network model for predicting orientation data. Accordingly, it is possible to apply a respective network model for different latency, so that the predicted orientation data can fit more accurately to the application in operation.

The present disclosure further discloses the experiment results of predicting the head movement using the orientation predicting method of the present disclosure and using the extrapolation method.

The experiment was carried out with 10 subjects. The 10 subjects were asked to play first-person shooter (FPS) game using the virtual reality headset, with the orientation data of each subject was collected during the game and used as the orientation training data. Since the FPS game played in this experiment possesses a 50 ms latency, a data segment corresponding to a 50 ms latency is cut from each orientation training data to obtain the adjusted orientation data. The orientation training data and the adjusted orientation data from the 10 subjects were then used to train an initial neural network model.

After training, the 10 subjects were asked to play the same FPS game again and a plurality of real-time orientation data of each subject was also collected during the game. That is, the plurality of real-time orientation data was continuously collected for a duration, which is 5 minutes in this experiment. For the convenience of description, the plurality of real-time orientation data of each subject herein includes a first real-time orientation data and a second real-time orientation data, and the second real-time orientation data is the first real-time orientation data 50 ms later.

Then the first real-time orientation data of the 10 subjects were both input to the trained neural network model and used in the extrapolation method respectively for predicting the head movement of the 10 subjects 50 ms later. Namely, the first real-time orientation data is used to obtain the predicted orientation data by the trained neural network model and the extrapolation method, and the predicted orientation data obtained by both methods can then be compared with the second real-time data respectively. After obtaining the predicted orientation data from both methods, the predicted orientation data and the second real-time data are compared using inter-subject method. That is, errors between the predicted orientation data obtained from the trained neural network model and the second real-time orientation data with different moving speeds and orientation indexes (roll, yaw and pitch), as well as errors between the predicted orientation data obtained from the extrapolation and the second real-time orientation data with different moving speeds and orientation indexes are collected and compared.

Figure 4A:
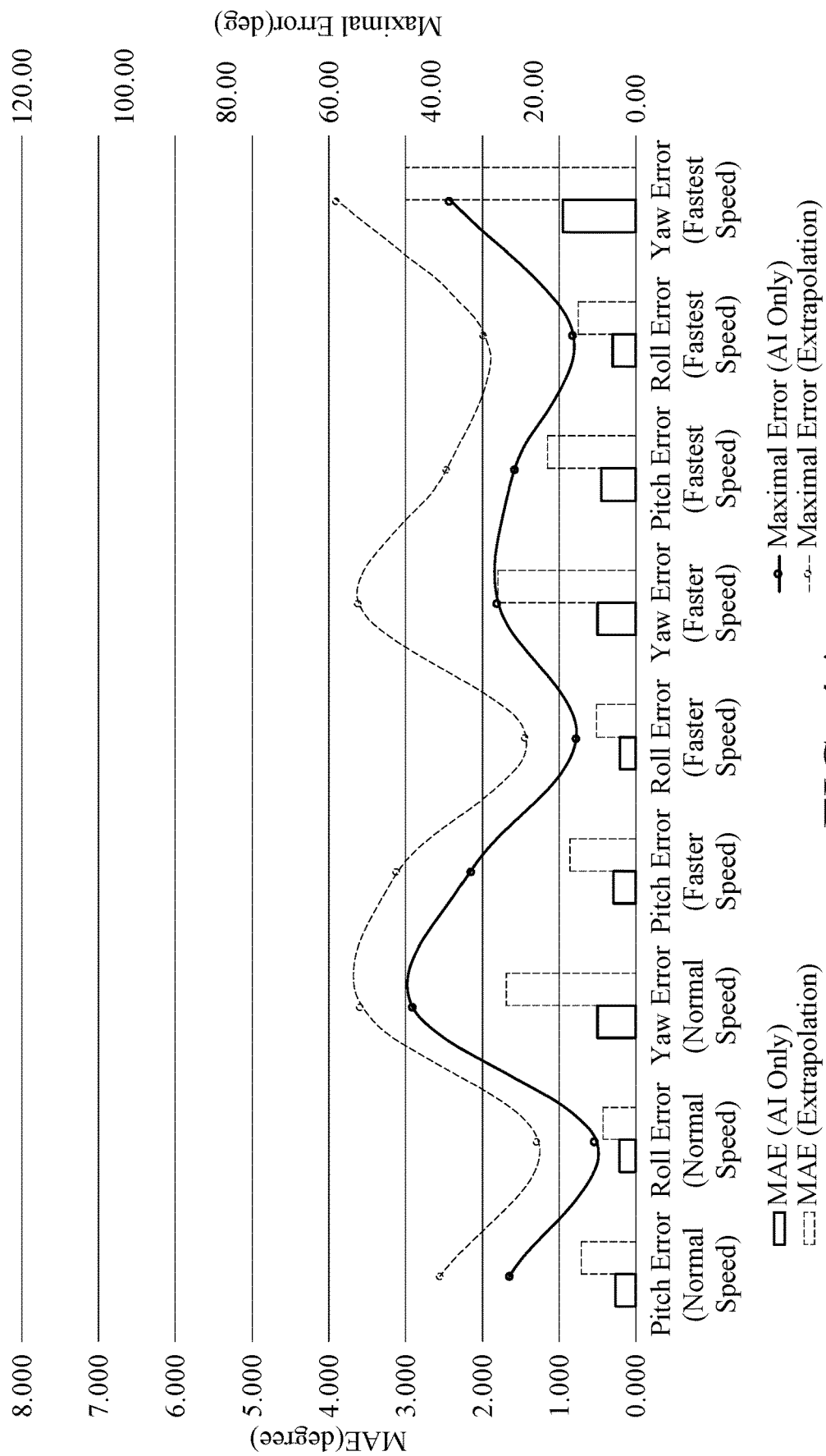
FIGS. 4A and 4B are statistic charts showing differences between the predicted orientation data and the real-time orientation data based on a 50 ms latency respectively obtained from using the extrapolation method and using the orientation predicting method of the present disclosure.
Figure 4B:
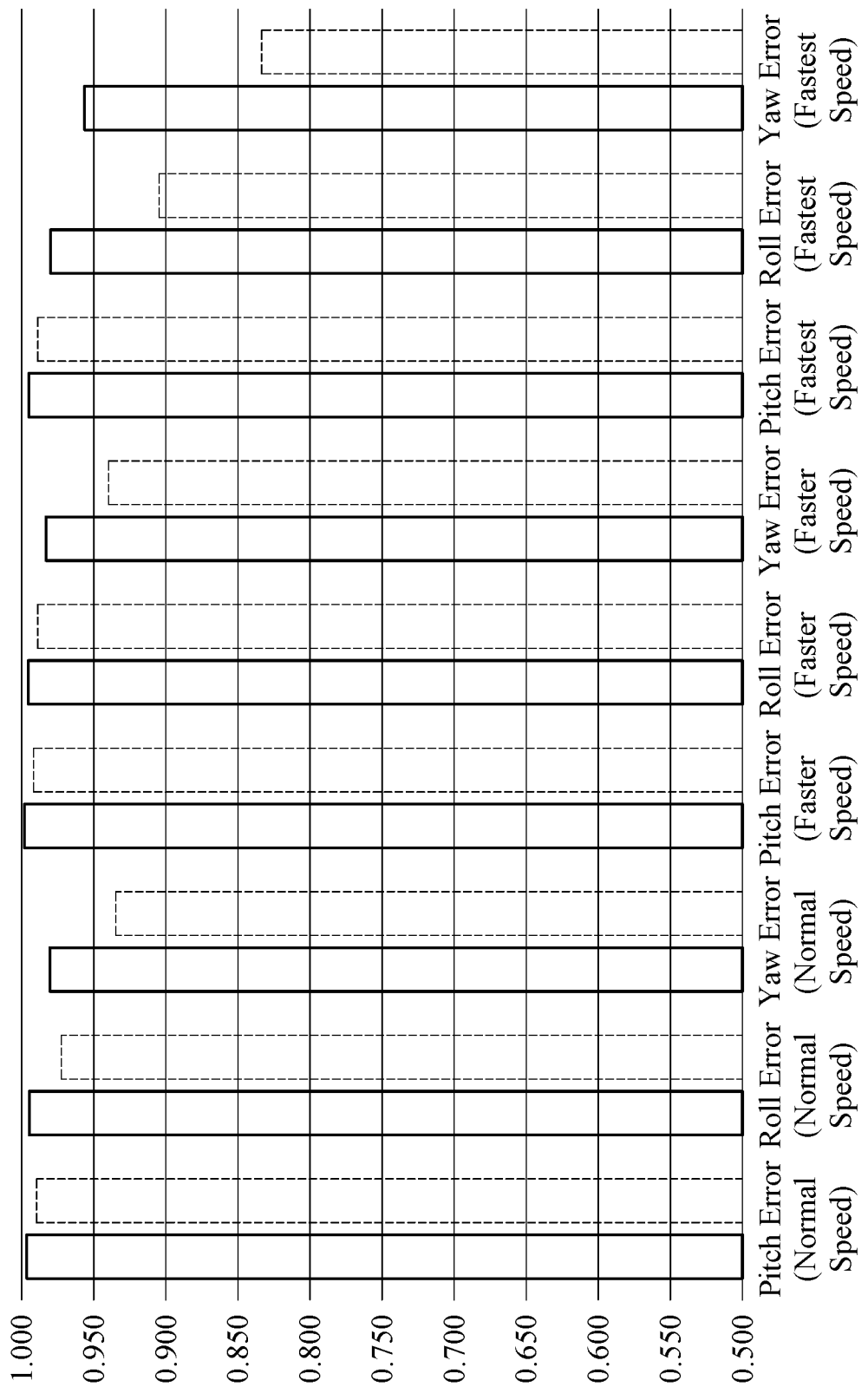

Please refer to FIGS. 4A and 4B, wherein FIGS. 4A and 4B are statistic charts showing differences between the predicted orientation data and the second real-time orientation data based on a 50 ms latency, wherein the differences are errors from using a linear extrapolation method and using the orientation predicting method of the present disclosure respectively, wherein the linear extrapolation method is described in particular in the publication by Garcia-Agundez, A et al. entitled "*An evaluation of extrapolation and filtering techniques in head tracking for virtual environments to reduce cybersickness.*", Joint International Conference on Serious Games (pp. 203-211). Springer, Cham.; Choi, S. W et al. entitled "*Prediction-based latency compensation technique for head mounted display.*", in 2016 *International SoC Desing Conference* (*ISOCC*) (pp. 9-10), IEEE.; and LaValle, S. M. et al. entitled "*Head*

*tracking for the Oculus Rift.*", in 2014 *IEEE International Conference on Robotics and Automation (ICRA)* (pp. 187-194). IEEE.

For the simplification of the charts, the orientation predicting method of the present disclosure shown in FIGS. 4A and 4B are represented as "AI".

The errors shown in FIG. 4A include pitch error, roll error, and yaw error at different speeds. And the graphs showing the errors from using the orientation predicting method of the present disclosure (AI only) are shown in solid lines, the graphs showing the errors from using extrapolation method are shown in dashed lines.

Pleaser first refer to FIG. 4A, the bar charts represent the errors calculated using mean absolute error (MAE) function, and the curves represent the maximal errors.

As seen from FIG. 4A, the MAE values of the extrapolation method are obviously higher than that of the AI only method whether the first real-time orientation data were obtained when the subject was moving at a normal speed or at a faster speed. Similarly, the maximal errors of the extrapolation method are obviously higher than that of the AI only method.

Please refer to FIG. 4B, the bar charts represent correlation coefficients between the predicted orientation data and the second real-time orientation data. As seen from FIG. 4B, the correlation coefficients of the AI only method are higher than that of the extrapolation method whether at a normal speed or at a faster speed.

Figure 5A:
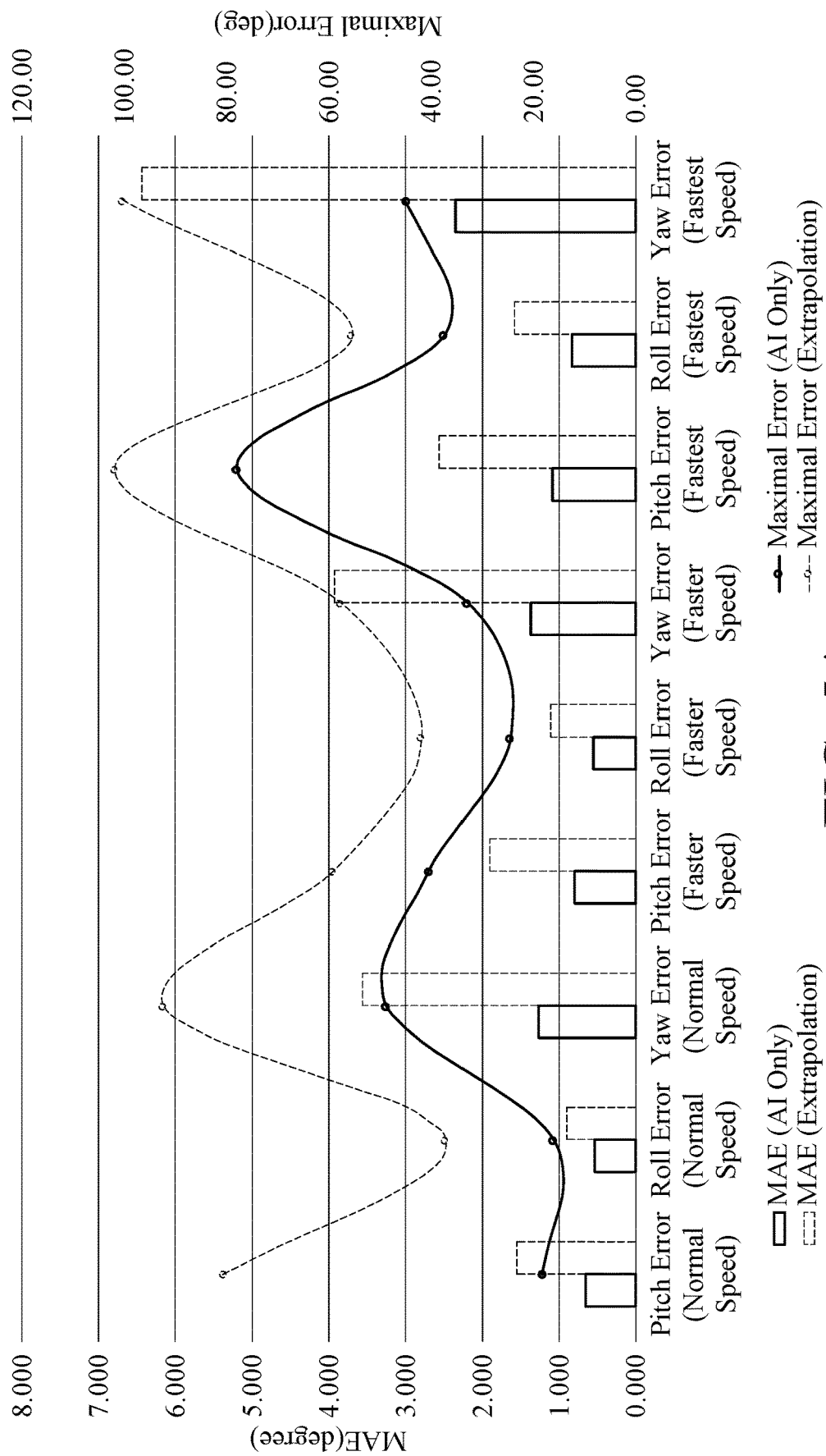
FIGS. 5A and 5B are statistic charts showing differences between the predicted orientation data and the real-time orientation data based on a 100 ms latency respectively obtained from using the extrapolation method and using the orientation predicting method of the present disclosure.
Figure 5B:
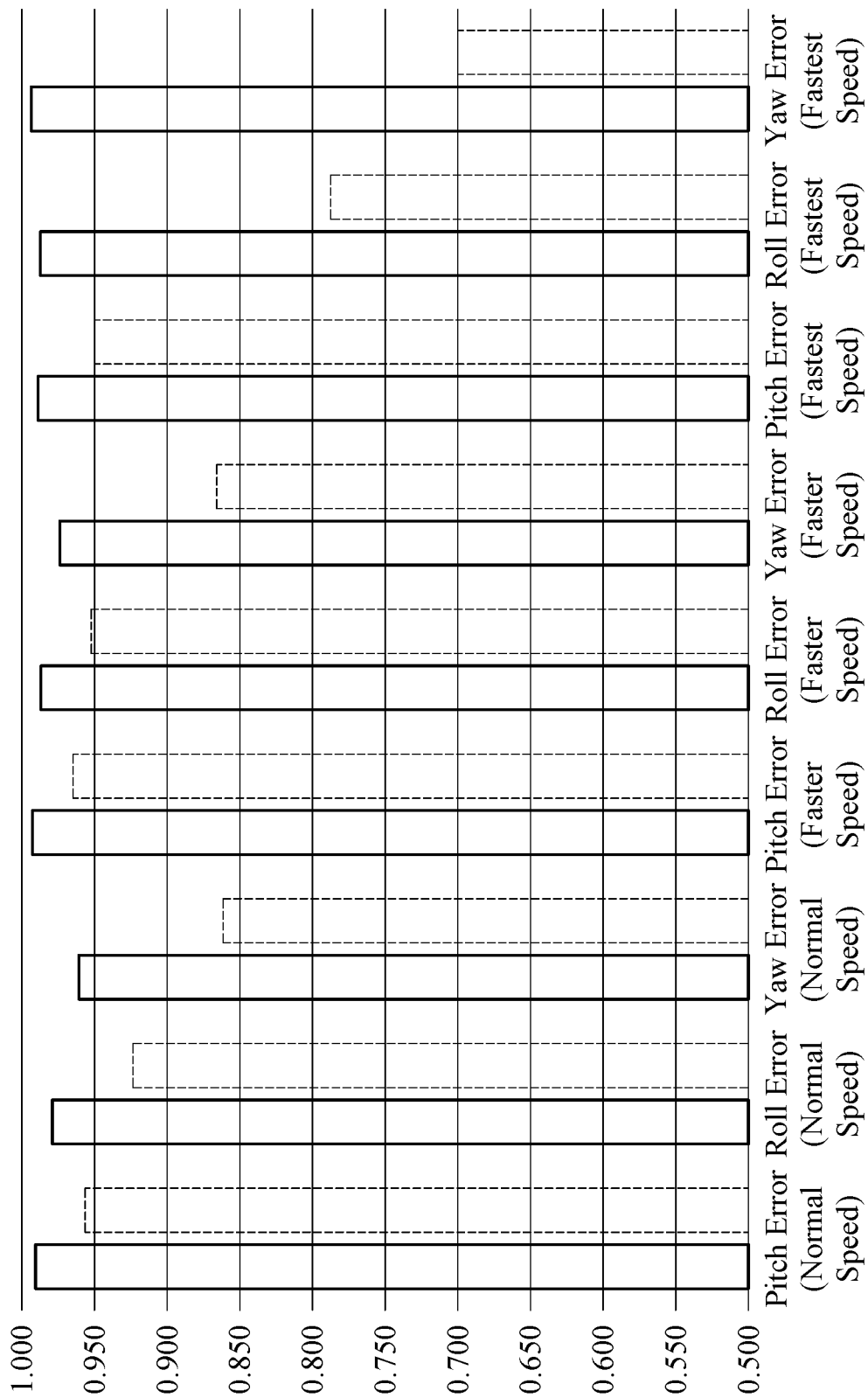

Please refer to FIGS. 5A and 5B, wherein FIGS. 5A and 5B are statistic charts showing differences between the predicted orientation data and the real-time orientation data based on a 100 ms latency, wherein the differences are errors from using the extrapolation method and using the orientation predicting method of the present disclosure respectively. Similar to FIGS. 4A and 4B, the orientation predicting method of the present disclosure shown here are represented as "AI".

That is, the experiment of FIGS. 5A and 5B is similar to that of FIGS. 4A and 4B, the difference between FIGS. 5A and 5B and FIGS. 4A and 4B is that the latency of FIGS. 5A and 5B is 100 ms.

Similar to the result of FIG. 4A, the MAE values as well as the maximal errors of the extrapolation method are obviously higher than that of the AI only method according to the bar chart in FIG. 5A. Further, the correlation coefficients of the AI only method are higher than that of the extrapolation method according to FIG. 5B.

In short, as seen from FIGS. 4A and 4B and FIGS. 5A and 5B, the errors caused by the orientation predicting method of the present disclosure are significantly lower than using the extrapolation method (with p value<0.05); and the correlation between the predicted data and the real data (the second real-time orientation data) are significantly higher in the orientation predicting method of the present disclosure than in the extrapolation method (with p value<0.05). Therefore, it is obvious that regardless of the moving speed and the duration of the latency, the orientation predicting method of the present disclosure is able to predict the user's head movement more accurately, thereby avoid motion sickness caused by the MTP latency when using virtual reality headset.

In view of the above description, according to one or more embodiments of the orientation predicting method, a virtual reality headset and a non-transitory computer-readable medium of the present disclosure, the MTP latency can be effectively reduced and an accurate head movement of the user can be made, therefore, the user can have a better experience when using the virtual reality headset without having motion sickness.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. An orientation predicting method, adapted to a virtual reality headset, comprising:
   obtaining an orientation training data and an adjusted orientation data, wherein the adjusted orientation data is obtained by cutting a data segment off from the orientation training data, wherein the data segment corresponds to a time interval determined by an application latency;
   training an initial neural network model based on the orientation training data and the adjusted orientation data for obtaining a trained neural network model corresponding to the time interval;
   retrieving a real-time orientation data by an orientation sensor of the virtual reality headset; and
   inputting the real-time orientation data to the trained neural network model to output a predicted orientation data,
   wherein the trained neural network model is one of a plurality of candidate neural network models, with said candidate neural network models corresponding to different time intervals respectively, and wherein before retrieving the real-time orientation data by the orientation sensor of the virtual reality headset, the method further comprises:
   estimating a latency of an application run by the virtual reality headset; and
   selecting the trained neural network model from the plurality of candidate neural network models according to the latency, with the latency closer to the time interval corresponding to the trained neural network model than to the time intervals corresponding to the others of the candidate neural network models.

2. The method according to claim 1, wherein the initial neural network model comprises a one-dimensional convolutional neural network.

3. A virtual reality headset, comprising:
   an orientation sensor, retrieving a real-time orientation data of the virtual reality headset;
   a processor, inputting the real-time orientation data to a trained neural network model of the processor for obtaining a predicted orientation data, wherein the trained neural network model is obtained by training an initial neural network model based on an orientation training data and an adjusted orientation data, wherein the adjusted orientation data is obtained by cutting a data segment off from the orientation training data, wherein the data segment corresponds to a time interval determined by an application latency;
   a screen, displaying a predicted image according to the predicted orientation data; and
   a memory storing a plurality of candidate neural network models including the trained neural network model, wherein before inputting the real-time orientation data to the trained neural network model, the processor further estimates a latency of an application run by the virtual reality headset, and selects the trained neural network model from the plurality of candidate neural network models, with the latency closer to the time interval corresponding to the trained neural network model than to the time intervals corresponding to the others of the candidate neural network models.

4. The virtual reality headset according to claim 3, wherein the initial neural network model comprises a one-dimensional convolutional neural network.

5. A non-transitory computer-readable medium, storing an executable instruction which, when executed, causes a virtual reality headset to perform a method comprising:

retrieving a real-time orientation data by an orientation sensor and inputting the real-time orientation data to a trained neural network model to output a predicted orientation data, wherein the trained neural network model is obtained by training an initial neural network model based on an orientation training data and an adjusted orientation data, wherein the adjusted orientation data is obtained by cutting a data segment off from the orientation training data, wherein the data segment corresponds to a time interval determined by an application latency, wherein the trained neural network model is one of a plurality of candidate neural network models, with said candidate neural network models corresponding to different time intervals respectively, and wherein before receiving the real-time orientation data from the orientation sensor, further comprises:

estimating a latency of an application run by the virtual reality headset; and selecting the trained neural network model from the plurality of candidate neural network models according to the latency, with the latency closer to the time interval corresponding to the trained neural network model than to the time intervals corresponding to the others of the candidate neural network models.

6. The non-transitory computer-readable medium according to claim 5, wherein the neural network model comprises a one-dimensional convolutional neural network.

* * * * *